April 8, 1930. J. J. GILBERT 1,753,336
DUPLEX TELEGRAPH SYSTEM FOR LOADED CABLES
Original Filed Dec. 31, 1927
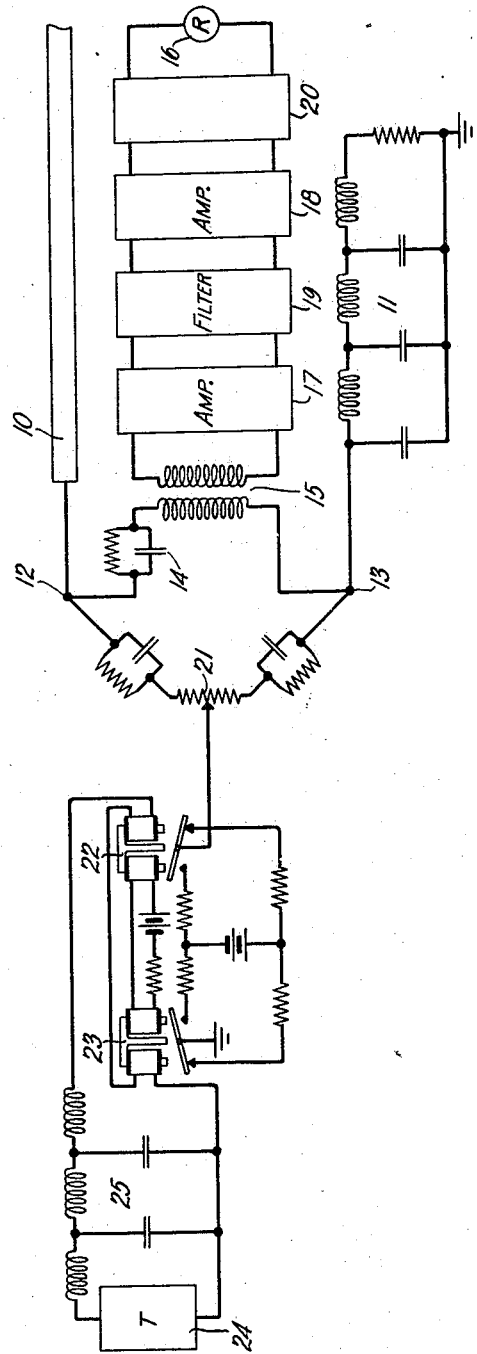
INVENTOR
JOHN J. GILBERT
BY J. W. Schmied
ATTORNEY Patented Apr. 8, 1930

1,753,336

UNITED STATES PATENT OFFICE

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK

DUPLEX TELEGRAPH SYSTEM FOR LOADED CABLES

Application filed December 31, 1927, Serial No. 244,025. Renewed July 13, 1929.

This invention relates to submarine cable telegraph systems, particularly those systems arranged for duplex operation.

The object of this invention is to reduce the detrimental effects of unbalance due to hysteresis in a high speed loaded cable duplex system, in which the cable and artificial line have different hysteresis characteristics.

Another object is to reduce the number and magnitude of voltage changes in the transmitted signals and thus reduce the cumulative unbalance due to the superposition of unbalance impulses arising from different transmitted impulses.

A further object is to obtain this result without eliminating from the signaling impulses impressed upon the line those components which are effective at the receiver, to produce accurate reception at any given speed of transmission.

In a submarine cable telegraph system employing a loaded cable the unbalance due to the transmission of a single impulse is distributed over a considerable period of time, measured in terms of a dot impulse at a given signal frequency. This is due to the comparatively low velocity of propagation of signals over a loaded cable and the comparatively high speed of signaling. On account of the spreading out of the unbalance due to the transmission of a single impulse, the unbalances due to a succession of signal impulses constituting a message, will be superimposed, and unbalance peaks arising from various signaling impulses will coincide or overlap. The resulting unbalance has a maximum amplitude, in some cases three or four times as large as the maximum amplitude of the unbalance due to a single impulse transmitted by itself. It has been found that the most serious accumulations of unbalance of this sort are due to unbalance impulses separated by a time which bears a definite relation to the length of a signal impulse and the effect can be reduced by designing the artificial line so that various sections of networks of which the artificial line is composed, can be adjusted more closely than would be required if the unbalance for the single impulse alone were to be considered. The cumulative unbalance can also be diminished by reducing the amplitude and frequency of occurrence of the changes of voltage involved in transmitting signals. The latter method of diminishing this cumulative unbalance is preferable in a system employing a two-unit code for transmission, wherein the signals are so modified in transmission that whenever a train of alternately positive and negative impulses of unit length are ordinarily transmitted, the cable is grounded for a period of the train. Consequently, the succession of message impulses transmitted over the cable lacks the unit impulses of alternate polarity, but these impulses can be interpolated in their proper order in the message by a vibrating relay arrangement at the receiving end of the cable. It is obvious that in transmitting impulses of two or more units length, there are many fewer changes or voltages than with ordinary two-element or three-element signals, and that the average change of amplitude in the transmitting voltage as well as the number of changes is less than would be encountered if the impulses of unit length were transmitted.

According to the present invention two-element signals, that is, those composed of positive and negative impulses, without being interspersed by zero intervals, are transmitted through a network designed to suppress all frequencies at and above the dot frequency, and to allow all the other frequencies to pass. The frequencies passing through the network are received in a pair of "sending-on" relays which operate in response thereto and reproduce for transmission over the cable a signal wave of substantially square topped shape. In the square topped wave many of the high frequency components are transmitted, though the dot frequency component which is included, is much smaller than it would be without dot suppression. This is a characteristic and noteworthy feature. These relatively high frequency components perform a useful function at the receiver before they are suppressed in the receiving apparatus by a second network, and the low frequency components, corresponding to the signals of two or more units length, are received in an amplifier wherein they are amplified to operate a receiving or recording device. The vibrating relay device which operates in synchronism with the transmitting equipment at the sending end of the cable is ordinarily arranged to produce unit impulses of alternate polarity, in a manner well known in the art, which control the receiving device during the periods in which the receiving device is nonresponsive to the incoming signal wave, thereby replacing the unit impulses lost in suppressing the dot frequency.

This invention will be fully understood from the following description taken in connection with the accompanying drawing in which the single figure illustrates the preferred embodiment of the present invention as applied to a bridge duplex telegraph system designed to transmit the two-element code.

Referring to the drawing the submarine cable 10, having a continuous loading of "permalloy," terminates in a bridge duplex telegraph set having an artificial line 11 equipped with loading coils wound on cores of magnetic material, such as compressed iron dust, permalloy dust or the like. The magnetic qualities of the cores differ considerably from those of the "permalloy" tape or wire wound on the cable, and therefore an unbalance due to hysteresis is produced between the cable and artificial line at the beginning of each current impulse transmitted. This unbalance produces a distortion in the incoming signal wave. This distortion becomes particularly troublesome each time the polarity of the signals is reversed.

Cable 10 is connected to one side of the duplex bridge arrangement and the artificial line 11, comprising the well-known ladder type of network constituted of sections simulating in electrical characteristics different sections of cable 10, is connected to the other side. In the bridge arrangement between the conjugate points 12 and 13 is connected shunted receiving condenser 14 in series with the transformer 15, the secondary winding of which is connected to a receiver 16 through two stages 17 and 18 of amplification, a high frequency suppression network or filter 19 and a vibrating relay circuit 20.

The cable and artificial line are interconnected at a resistance apex 21 through the ratio arms, each of which includes a shunted condenser. A sliding contact arranged to engage the resistance apex 21 is connected to the armature of relay 22, which relay forms with relay 23 a pair of "sending-on" relays for reproducing impulses of two or more units length received from a transmitter 24 for transmission over the cable. The relays are of the polarized type and are normally controlled by a closed circuit extending through the left hand winding of relay 22 and the right hand winding of relay 23. The relays therefore normally connect the cable to earth through the battery tap resistances, as shown in the drawing. The right hand winding of relay 22 and the left hand winding of relay 23 are connected in a circuit extending through transmitter 24. Intermediate the transmitter and "sending on" relays is a low pass filter 25, designed to suppress the dot and higher frequencies of the signaling current so that only impulses of two or more units length operate the relays. The right hand winding of relay 22 and the left hand winding of relay 23 are so arranged with respect to each other that currents from the transmitter pass therethrough in opposite directions and these currents are of sufficient strength to overcome the biasing current in the other windings. The transmitter may be of any of the well-known types adapted for telegraphic signaling, the preferred types being those disclosed in Patent No. 1,536,764, granted to O. E. Buckley on May 5, 1925.

A feature of the invention is the filter 25 which is designed as stated above to suppress the dot and higher frequencies of the transmitter currents so that only the impulses of two or more units length are effective to overcome the biasing current in relays 22 and 23 and to thereby impress upon the cable impulses corresponding in polarity to the long impulses sent out from transmitter 24, earth being connected to the cable in the intervals in which impulses of unit length would be transmitted. In reducing the number of impulses transmitted over the cable, the average time between impulses is increased, and the possibility of superposition of unbalance impulses from a number of signal impulses is reduced. Analysis of the operation shows that some wave energy of dot frequency will, with certain signal combinations of impulses, be impressed upon the cable conductor. Nevertheless, it will be seen that the average amplitude and average number of voltage changes are reduced from whence it follows that the average interference due to duplex unbalance caused by the cumulative effect of disturbances due to successive voltage changes is also reduced. Because the voltage changes are less frequent it follows that with the same persistence of disturbance due to each voltage change the number of disturbances which can overlap becomes reduced.

The apparatus diagrammatically shown in the drawing is representative of that used at the distant end of the cable and for the purpose of describing the manner in which the signal wave transmitted over the cable is received, modified and recorded at the distant end, the arrangement shown will be utilized.

The signaling wave upon reaching the distant end of the cable will be somewhat attenuated and the square-topped form is rounded off so that if it is recorded at this point, it will look somewhat like a sinusoidal wave. Signals in this form are received in receiving condenser 14 and a transformer 15 and are herein reshaped to somewhat the same form in which they entered the cable at the sending end. These signals are then amplified by a vacuum tube amplifier 17 of some suitable distortionless type and passed through a low pass filter 19, wherein the components in the neighborhood of the dot frequency are suppressed. The low frequency components which succeed in getting through filter 19 are further amplified by amplifier 18 for the satisfactory operation of vibrating relay circuit 20 and recorder 16. The vibrating relay circuit may be any of the well-known types, particularly those capable of effecting the operation of the recorder during the intervals corresponding to those in which the impulses of unit length were suppressed and the cable connected to earth at the transmitting end. A suitable type of vibrating relay circuit is disclosed in Patent No. 1,464,088, issued to G. C. Cummings on August 7, 1923.

Transmission and reception apparatus in accordance with the invention may be employed for one-way operation and also coil-loaded conductors. The principal objects of the invention, however, relate to duplex operation.

The scope of the invention is not restricted to the specific embodiment shown and described, but it may include modifications which do not depart from the principles herein stated.

What is claimed is:

1. The method which comprises converting impulses of frequency corresponding to a given dot signaling frequency supplied by a telegraph transmission system into revised impulses of greater average time between voltage changes and containing useful energy of frequency at about the dot signaling frequency, and impressing said revised impulses upon the signaling conductor.

2. A duplex method of reception in accordance with claim 1 which comprises suppressing unbalanced dot frequency energy from the local transmitter in the local receiving circuit.

3. In a duplex telegraph system employing a loaded cable, a method of diminishing cumulative unbalance due to successive changes of voltage in a transmitted impulse train which consists in increasing at the transmitting end the average time between voltage changes in the impulse train without substantially total elimination of necessary frequency components higher than the signaling frequency.

4. In a duplex telegraph system employing a loaded cable and an artificial line, a method of diminishing cumulative unbalance due to successive voltage changes which consists in substantially suppressing, at the transmitter, the dot frequency component of the transmitted wave, and transmitting at practically full strength frequency components above and below the dot frequency together with a dot frequency component which is considerably smaller than it would be without dot suppression, thereby effecting transmission with practically no loss of speed.

5. In duplex operation of a loaded submarine telegraph cable, the method of reducing duplex unbalance which comprises substantially reducing, at the transmitter, the predominant dot frequency component of the transmitted wave, transmitting at practically full strength frequency components above and below the dot frequency, and rebuilding at the receiver the suppressed dot frequency components.

6. A telegraph transmitter comprising a transmitter functioning to produce impulses of unit length and other impulses of greater length, a selective circuit supplied by said transmitter having a transmission characteristic to suppress frequencies corresponding to the unit impulses, relay mechanism operated by impulses of greater length supplied by said selective circuit, and a conductor leading away from said relay mechanism and supplied with impulses produced by the operation thereof.

7. In a duplex telegraph system, a loaded signaling conductor, an artificial line for balancing said conductor having different hysteresis characteristics from said conductor, a transmitter for supplying impulses of unit length and greater, and of alternately opposite polarity to said conductor and artificial line through a duplex connection, means inserted between said transmitter and said duplex connection for eliminating voltage reversals of unit length, a receiver connected across the duplex bridge arms, a low pass filter in said receiver input circuit, and means in said receiver for rebuilding impulses of unit length and less.

8. In a duplex telegraph system comprising a loaded signaling conductor and a balancing artificial line therefor which has magnetic characteristics different from those of the signaling conductor, a transmitter arranged to transmit signaling impulses of alternately opposite polarity and of dot length or greater to said conductor and artificial line through a duplex connection, means to prevent the transmission of impulses of dot length although permitting transmission of longer impulses substantially without distortion, a receiving circuit connected between said conductor and artificial line, a low pass filter adapted to attenuate all frequency components of dot frequency and greater, in the input of said receiving circuit, and regenerating means in said receiving circuit for rebuilding dot impulses which have been suppressed at the transmitter.

9. In a duplex telegraph system a long loaded signaling conductor and a balancing artificial line therefor which has magnetic characteristics different from those of the signaling conductor, a transmitter arranged to transmit signaling impulses of alternately opposite polarity and of dot length or greater to said conductor and artificial line through a duplex connection, means arranged intermediate the transmitter and duplex connection for preventing the transmission of impulses of dot length although permitting transmission of longer impulses substantially without distortion, regenerating means responsive to said longer impulses and not responsive to impulses of dot length, said regenerating means being aranged to transmit over said conductor a substantially square-topped signal wave comprising many high frequency components together with the dot frequency component which is now considerably smaller than would be without dot suppression, a receiving circuit connected between said conductor and artificial line, a low pass filter adapted to attenuate all frequency components at and about the dot frequency in the output of said receiving circuit, and other regenerating means in said receiving circuit for rebuilding the dot impulses which have been suppressed at the transmitter.

10. In a regenerative telegraph system, a transmitter, a line circuit, regenerative apparatus for regenerating the impulses of unit length at the receiver, and a wave selection circuit having high attenuation for the fundamental frequency corresponding to impulses of unit length in circuit between the line circuit and the regenerative apparatus.

11. In a system of impulse transmission over a conductor in which unit length impulses characteristic of elements of a code to be transmittted are not received in effective amplitude but are regenerated at the receiver, the method of transmission which comprises impressing of multiple length impulses upon the conductor and impressing a continuous uniform voltage upon the conductor at times when unit length impulses occur in the succession of code impulses.

12. A method according to claim 11 in which the continuous uniform voltage is zero voltage.

13. Apparatus for executing the method of claim 11 comprising means for producing unit and plural unit length impulses representing intelligence to be transmitted, means to be controlled by said first mentioned means to impress plural unit length impulses upon the outgoing conductor and to ground the conductor when said first mentioned means produce unit length impulses.

In witness whereof, I hereunto subscribe my name this 29th day of December, 1927.

JOHN J. GILBERT.